United States Patent
Sasaki et al.

(10) Patent No.: US 9,438,107 B2
(45) Date of Patent: Sep. 6, 2016

(54) CONTROL DEVICE, CONTROL METHOD, AND POWER SUPPLY DEVICE

(71) Applicant: FUJITSU LIMITED, Kawasaki-shi, Kanagawa (JP)

(72) Inventors: Tomotake Sasaki, Kawasaki (JP); Tsugito Maruyama, Yamato (JP); Yu Yonezawa, Sagamihara (JP); Yoshiyasu Nakashima, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 251 days.

(21) Appl. No.: 14/095,203

(22) Filed: Dec. 3, 2013

(65) Prior Publication Data
US 2014/0232365 A1    Aug. 21, 2014

(30) Foreign Application Priority Data

Feb. 20, 2013    (JP) .................................. 2013-031478

(51) Int. Cl.
*H02M 3/156*    (2006.01)
*H02M 1/00*    (2006.01)

(52) U.S. Cl.
CPC ..... *H02M 3/156* (2013.01); *H02M 2001/0025* (2013.01); *H02M 2001/0032* (2013.01)

(58) Field of Classification Search
CPC ............ H02M 2001/0025; H02M 2001/0032; H02M 3/156; H02M 3/157; H02M 2003/1566
USPC ....................................................... 323/288
See application file for complete search history.

(56) References Cited

U.S. PATENT DOCUMENTS

| 7,292,014 | B2 * | 11/2007 | Lee ......................... | H03F 3/217 323/266 |
|---|---|---|---|---|
| 2002/0060560 | A1 * | 5/2002 | Umemoto ............. | H02M 3/156 323/288 |
| 2003/0151933 | A1 * | 8/2003 | Haraguchi ............ | H02M 3/156 363/41 |
| 2007/0103949 | A1 * | 5/2007 | Tsuruya .............. | H02M 1/4225 363/125 |
| 2008/0129264 | A1 * | 6/2008 | Moussaoui ........... | H02M 3/156 323/283 |
| 2008/0136395 | A1 * | 6/2008 | Bennett ................. | H02M 3/156 323/288 |
| 2009/0009148 | A1 * | 1/2009 | Philbrick ............. | H02M 3/156 323/282 |
| 2009/0072807 | A1 * | 3/2009 | Qiu .................. | H02M 3/33507 323/285 |
| 2009/0102446 | A1 |  | 4/2009 | Takahashi et al. |
| 2011/0304309 | A1 * | 12/2011 | Nakamura ............ | H02M 3/156 323/288 |

(Continued)

FOREIGN PATENT DOCUMENTS

| JP | 2003-088131 | 3/2003 |
|---|---|---|
| JP | 2009-100607 | 5/2009 |

OTHER PUBLICATIONS

Patent Abstracts of Japan, Publication No. 2009-100607, Published May 7, 2009.

(Continued)

*Primary Examiner* — Fred E Finch, III
(74) *Attorney, Agent, or Firm* — Staas & Halsey LLP

(57) ABSTRACT

A control device includes: a power supply circuit that controls output voltage using a switching element; a generation unit that generates a reference signal on the basis of the output voltage from the power supply circuit; a PWM unit that generates a PWM signal that is output to the switching element by comparing the reference signal with a carrier signal; and a switching unit that switches a frequency of the carrier signal by changing amplitude of the carrier signal, wherein the generation unit generates the reference signal on the basis of the frequency.

20 Claims, 15 Drawing Sheets

(56) References Cited

U.S. PATENT DOCUMENTS

2014/0078784 A1* 3/2014 Nishijima ............... H02M 1/44
 363/21.01
2014/0091774 A1* 4/2014 Srinivasan .............. G05F 1/468
 323/271

OTHER PUBLICATIONS

Japanese Office Action issued Jul. 26, 2016 in corresponding Japanese Patent Application No. 2013-031478 (4 pages) (3 pages English Translation).

* cited by examiner

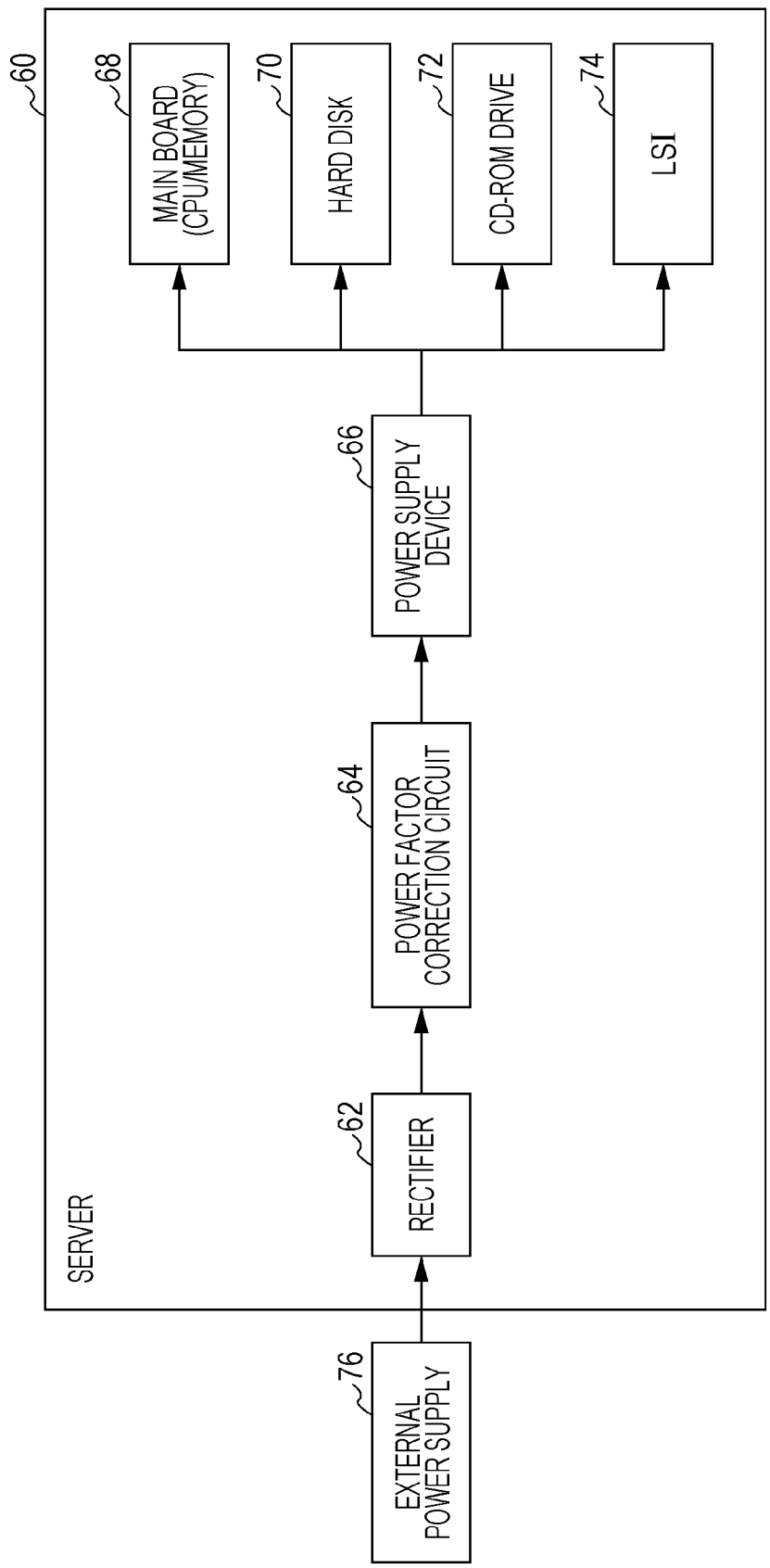

CONTROL DEVICE, CONTROL METHOD, AND POWER SUPPLY DEVICE

CROSS-REFERENCE TO RELATED APPLICATION

This application is based upon and claims the benefit of priority from the prior Japanese Patent Application No. 2013-031478 filed on Feb. 20, 2013, the entire contents of which are incorporated herein by reference.

FIELD

The embodiments discussed herein are related to a control device, a control method, and a power supply device, and for example, a control device, a control method, and a power supply device, which controls a power supply circuit that controls output voltage using a switching element.

BACKGROUND

As a power supply circuit, a direct current (DC)-DC converter that performs conversion of DC voltage is known. For example, in an information processing device such as a server and a home appliance, alternating current (AC) voltage is converted into DC voltage using a rectifier and a power factor correction circuit. After the conversion, the DC voltage is stepped down using the DC-DC converter.

As a control method of a power supply circuit, a method of performing pulse width modulation (PWM) control on a switching element is known. In the PWM control, a pulse width of a PWM signal is modulated by comparing a carrier signal and a reference signal. The reference signal is generated on the basis of output voltage of a power supply circuit.

The switching element is turned on and off in response to the PWM signal that is modulated as described above. It is known that a switching frequency is controlled depending on the load in order to improve efficiency of the power supply circuit.

A method of changing a switching frequency by changing amplitude of a carrier signal is known (for example, first and second embodiments in Japanese Laid-open Patent Publication No. 2009-100607). In addition, it is known that a switching frequency is controlled by changing the slope of the wave of the carrier signal (for example, a third embodiment in Japanese Laid-open Patent Publication No. 2009-100607).

When the slope of the carrier signal wave is changed, selection of the frequency is limited because a switching frequency of a high frequency corresponds to an integral multiple of a switching frequency of a low frequency. Furthermore, when the amplitude of the carrier signal is changed, a transient response is undesirably generated in the output voltage of the power supply circuit because a duty ratio of the PWM signal varies at the time of change of the switching frequency.

An object of the control device, the control method, and the power supply device according to the embodiments is to stabilize the output voltage.

SUMMARY

According to an aspect of the invention, a control device includes: a power supply circuit that controls output voltage using a switching element; a generation unit that generates a reference signal on the basis of the output voltage from the power supply circuit; a PWM unit that generates a PWM signal that is output to the switching element by comparing the reference signal with a carrier signal; and a switching unit that switches a frequency of the carrier signal by changing amplitude of the carrier signal, wherein the generation unit generates the reference signal on the basis of the frequency.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 15 is a block diagram of a server in the first or second embodiment.

DESCRIPTION OF EMBODIMENTS

Figure 1:
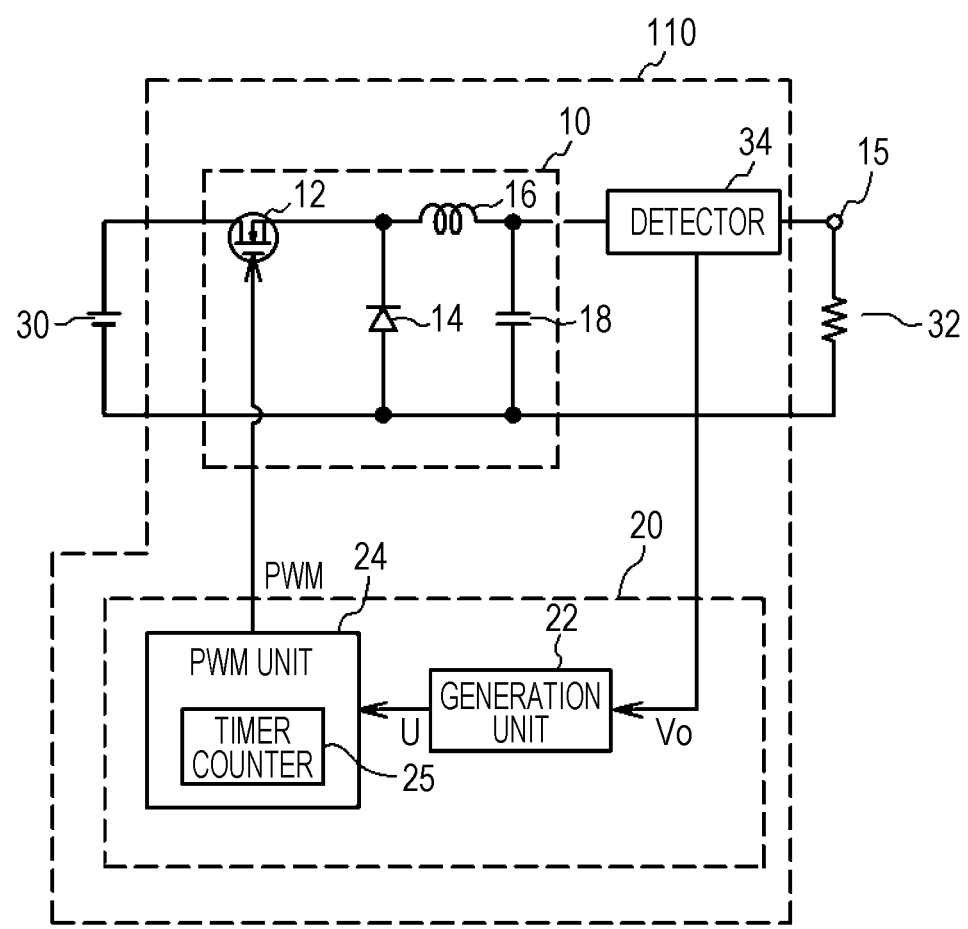
FIG. 1 is a block diagram of a power supply device according to a first comparative example.

FIG. 1 is a block diagram of a power supply device according to a first comparative example. Referring to FIG. 1, a power supply device 110 includes a power supply circuit 10 and a control device 20. The power supply circuit 10 includes a metal oxide semiconductor field effect transistor (MOSFET) 12, a diode 14, an inductor 16, and a capacitor 18. The n-type FET 12 and the inductor 16 are connected to each other in series between the positive electrode of a DC power supply 30 and an output terminal 15 of the power supply device. The drain of the FET 12 is connected to the positive electrode of the DC power supply 30, and the source of the FET 12 is connected to one end of the inductor 16. A PWM signal is input to the gate of the FET 12. The cathode of the diode 14 is connected to a node between the FET 12 and the inductor 16. The anode of the diode 14 is connected to the negative electrode of the DC power supply 30. One end of the capacitor 18 is connected to a node between the inductor 16 and the output terminal 15. The other end of the capacitor 18 is connected to the negative electrode of the DC power supply 30. The inductor 16 and the capacitor 18 constitute a smoothing circuit.

A load 32 is connected between the output terminal 15 and the negative electrode of the DC power supply 30. A detector 34 is connected between the output terminal 15 and the inductor 16 and capacitor 18. The detector 34 detects output voltage Vo of the power supply circuit 10 (that is, voltage of an output terminal) and current that flows through the load 32. The DC power supply 30 may be, for example, an AC-DC converter that converts AC voltage into DC voltage. The load 32 may be, for example, an internal circuit of an information processing device or a home appliance.

The control device 20 includes a generation unit 22 and a PWM unit 24. The generation unit 22 generates a reference signal U on the basis of the voltage Vo output from the detector 34. The PWM unit 24 generates a PWM signal, which is to be sent to the FET 12, by comparing the reference signal U and a carrier signal. The PWM unit 24 includes, for example, a timer counter 25. The timer counter 25 generates a carrier signal.

Figure 2:
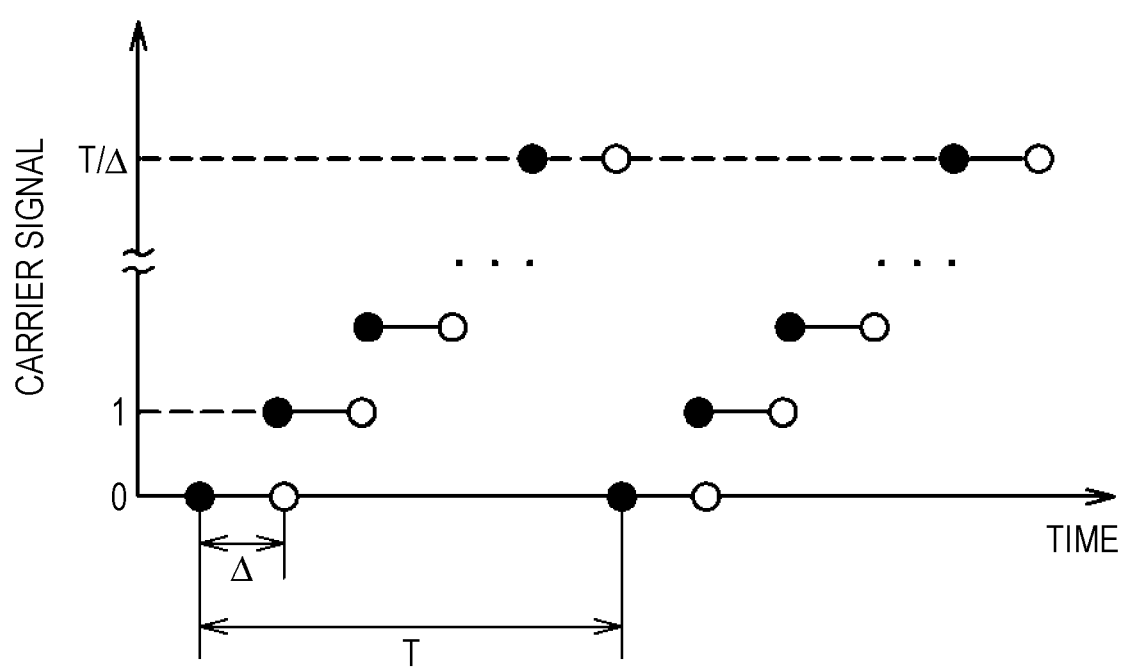
FIG. 2 is a timing chart of a count value signal that is generated by a timer counter.

FIG. 2 is a timing chart of a count value signal that is generated by the timer counter. The timer counter 25 makes a carrier signal on the basis of an integer and a clock signal. The cycle of the carrier signal is represented by "T", and the cycle of the clock signal is represented by "Δ". The cycle T is, for example, a value that is an integral multiple of the cycle Δ. The timer counter 25 counts up a count value for each cycle Δ of the clock signal. When the count value becomes the maximum value T/Δ, the timer counter 25 sets the count value at 0 and starts again the count-up for each of the cycles Δ of the clock signal. As described above, a carrier signal having a saw-tooth wave may be generated through such a count-up operation. In FIG. 2, an example in which the timer counter 25 counts up a count value is described, however, the timer counter 25 may count down a count value. In addition, in the following drawings, the illustration in which stair-like steps of a carrier signal are omitted may be made.

Figure 3:
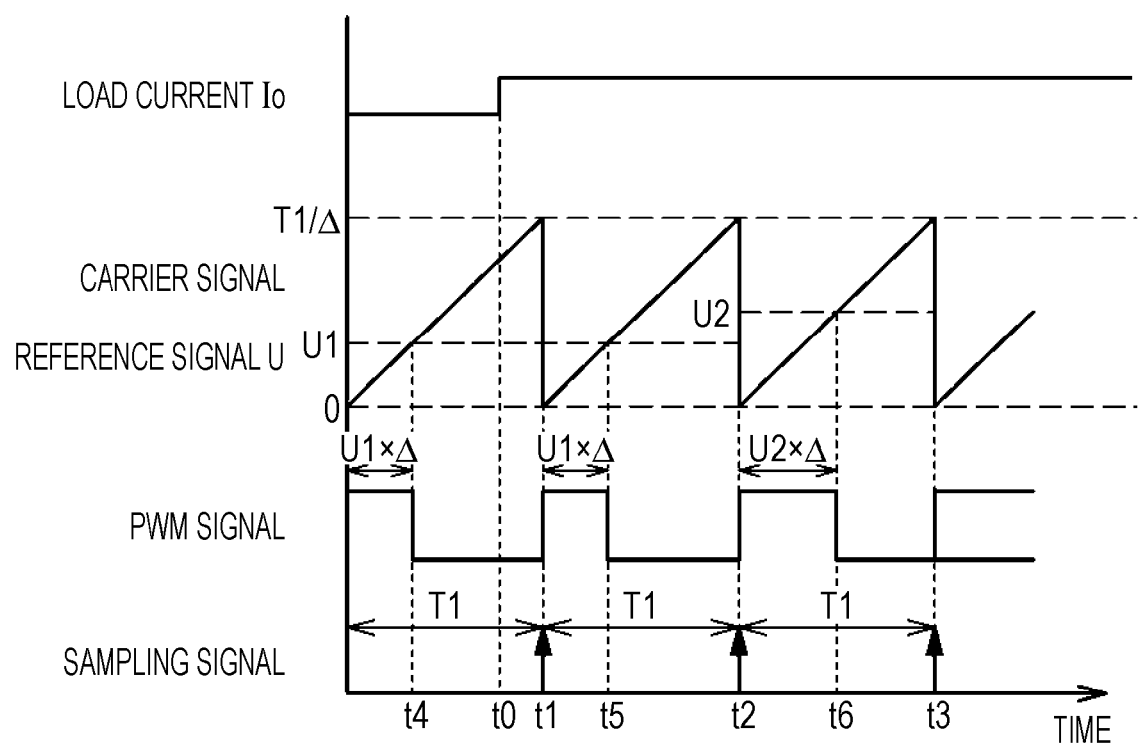
FIG. 3 is a timing chart of load current, a carrier signal, a PWM signal, and a sampling signal in the first comparative example.

FIG. 3 is a timing chart of load current, a carrier signal, a PWM signal and, a sampling signal in the first comparative example. Load current Io flows through the load 32. When the load current Io is small, it means that the load is light, and when the load current Io is large, it means that the load is heavy. As illustrated in FIG. 2, the carrier signal is generated by the timer counter 25. The reference signal U is generated by the generation unit 22. The PWM signal is generated by the PWM unit 24. The sampling signal is used to cause the detector 34 to perform sampling on the output voltage Vo, and is synchronized, for example, with the carrier signal.

The level of the load current Io is changed at the time t0 to a higher level. The increase in the load current Io indicates that, for example, power consumption of the load 32 is increased. The carrier signal is increased from "0" over a period of time and returns to "0" when the carrier signal reaches the maximum value T1/Δ. The times at which the carrier signal becomes "0" is represented by "t1", "t2", and "t3". The cycle of the carrier signal is "T1" and kept stable. When the carrier signal is lower than the reference signal U, the PWM signal is in a high level. When the carrier signal is higher than the reference signal U, the PWM signal is in a low level. The times at which the carrier signal corresponds to the reference signal U are represented by "t4", "t5", and "t6".

When the level of the load current Io is changed at the time t0 to a higher level, the output voltage Vo is reduced. At the time t1, a detection unit 34 performs sampling on the output voltage Vo. The generation unit 22 increases the reference signal U from "U1" to "U2" because the output voltage Vo is reduced. As a result, a time period in which the PWM signal is in the high level before the time t2 is represented by "U1×Δ", and a time period in which the PWM signal is in the high level after the time t2 is represented by "U2×Δ". Therefore, a duty ratio of the PWM signal before the time t2 is represented by "U1×Δ/T1", and a duty ratio of the PWM signal after the time t2 is represented by "U2×Δ/T1". As described above, after the time t2, the duty ratio is increased. Thus, a time period in which the FET 12 is turned on is increased, and the output voltage Vo is increased. As described above, the control device 20 controls the output voltage Vo to be stable by controlling the duty ratio of the PWM signal.

The switching frequency in which the efficiency becomes maximum is changed depending on the load 32. For example, there is a case in which the power consumption is reduced by decreasing the switching frequency when the load 32 is light. On the other hand, there is a case in which the power consumption is reduced by increasing the switching frequency when the load 32 is light. As described above, the switching frequency may be changed on the basis of the load 32.

Figure 4A:
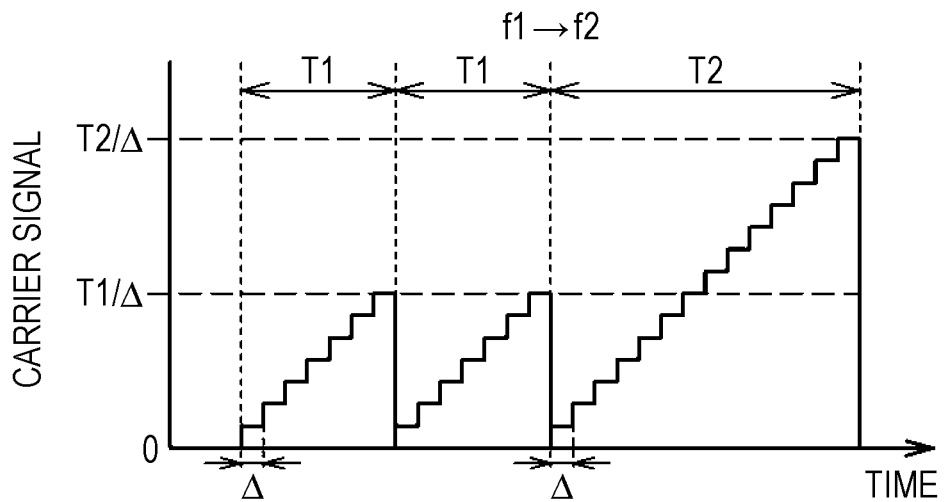
FIGS. 4A and 4B are timing charts illustrating examples of carrier signals when a switching frequency is changed.
Figure 4B:
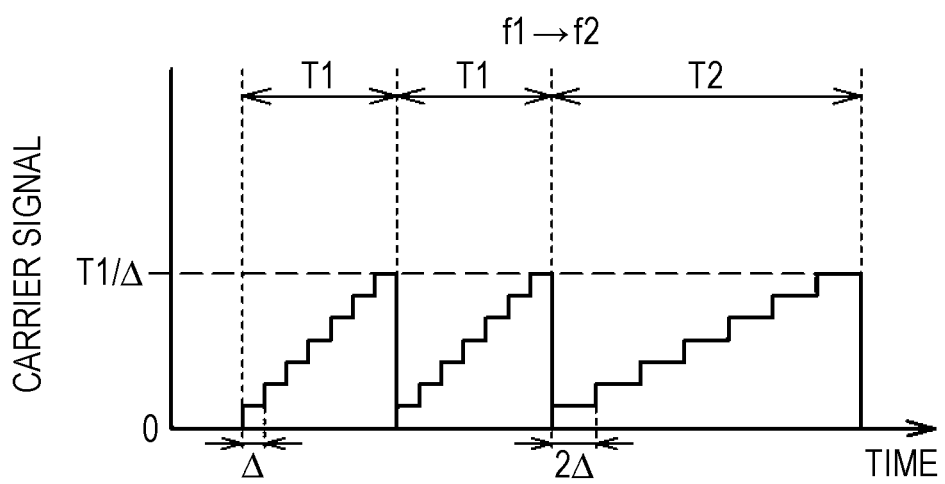

FIGS. 4A and 4B are timing charts illustrating examples of carrier signals when the switching frequency is changed. Referring to FIG. 4A, in a time period in which the cycle is "T1" (time period in which the frequency is "f1"), the timer counter 25 counts up a count value for each of the cycles Δ. When the count value reaches "T/Δ", the count value is returned to "0". In a time period in which the cycle is "T2" (time period in which the frequency is "f2"), the timer counter 25 counts up a count value for each of the cycles Δ. When the count value reaches "T2/Δ", the count value is returned to "0". As described above, the switching frequency may be changed by changing the size of the maximum count value (that is, amplitude of the carrier signal) without changing the slope of a count-up curve.

Referring to FIG. 4B, the time period in which the cycle is "T1" (time period in which the frequency is "f1") is similar to the time period in FIG. 4A. In the time period in which the cycle is "T2" (time period in which the frequency is "f2"), the timer counter 25 counts up a count value for each "2×Δ". When the count value reaches "T1/Δ", the count value is returned to "0". As described above, the switching frequency may be changed by setting the cycle of count-up at an integral multiple of the cycle Δ without changing the maximum count value.

However, in the method of FIG. 4B, the cycle T2 corresponds to an integral multiple of the cycle T1 because the cycle to perform count-up is set at the integral multiple of the cycle Δ. Therefore, selection of the switching frequency is limited. As described above, the method of FIG. 4A is desirable in the viewpoint of the selection of the switching frequency.

Figure 5:
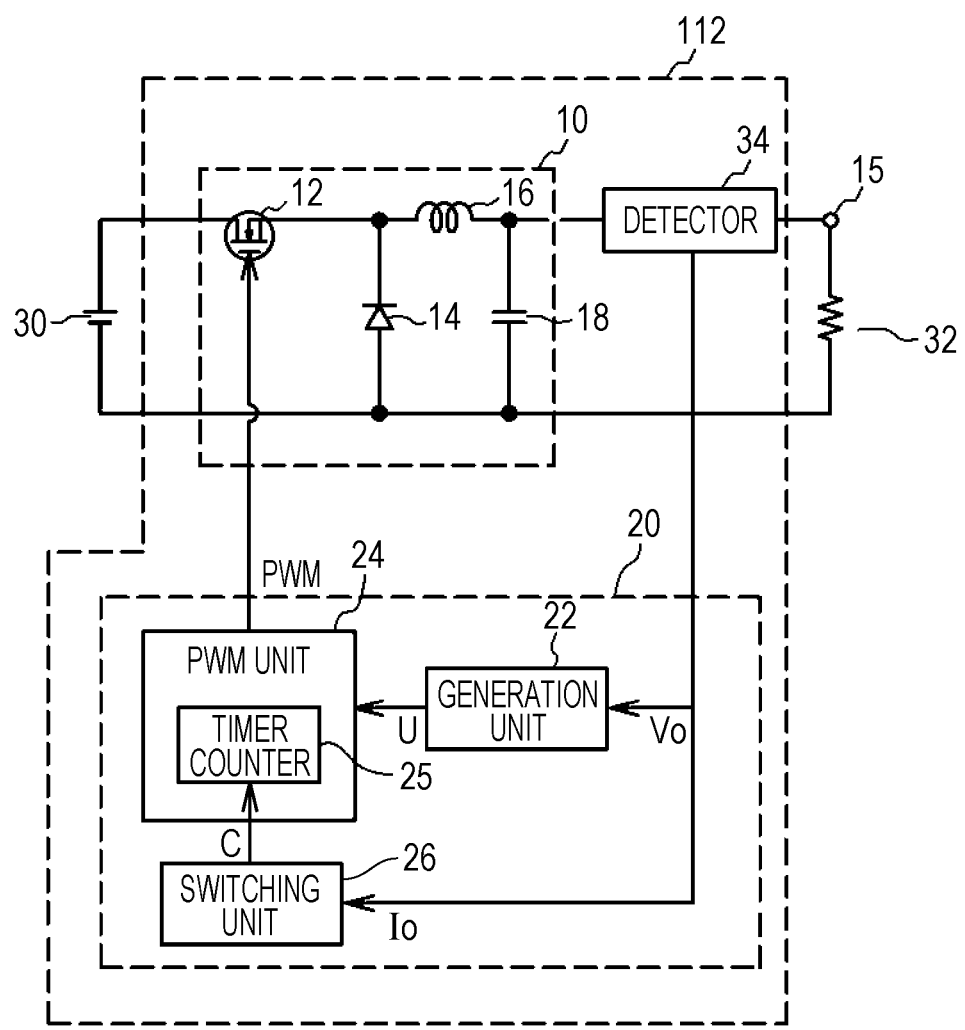
FIG. 5 is a block diagram of a power supply device according to a second comparative example.

A second comparative example using the method of FIG. 4A is described below. FIG. 5 is a block diagram of a power supply device according to the second comparative example. Referring to FIG. 5, in a power supply device 112, the control device 20 includes a switching unit 26. The switching unit 26 outputs a signal C that is used to change a switching frequency, to the timer counter 25 of the PWM unit 24 on the basis of the load current Io that is detected by the detector 34. The timer counter 25 changes the switching frequency on the basis of the signal C. The other elements in the configuration are similar to that of the first comparative example, and the description is omitted herein.

Figure 6:
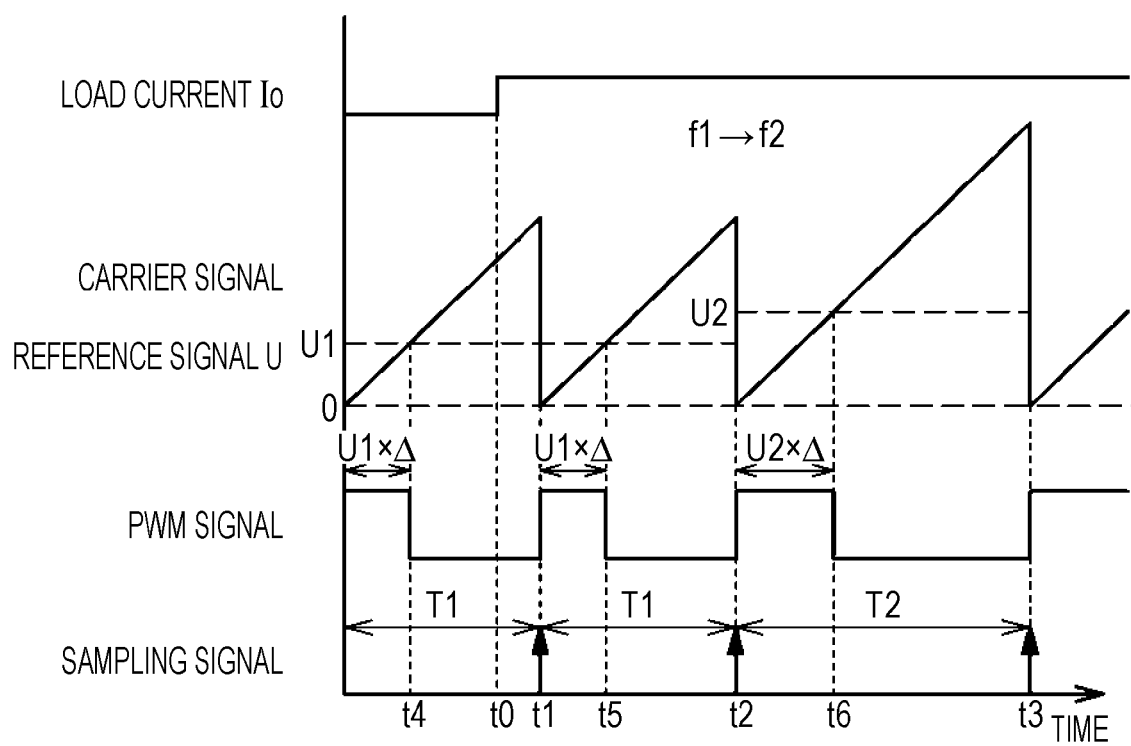
FIG. 6 is a timing chart of load current, a carrier signal, a PWM signal, and a sampling signal in the second comparative example.

FIG. 6 is a timing chart of load current, a carrier signal, a PWM signal, and a sampling signal in the second comparative example. Referring to FIG. 6, the switching frequency and the cycle before the time t2 correspond to "f1" and "T1", respectively. The switching frequency and the cycle after the time t2 correspond to "f2" and "T2", respectively. A time period in which the PWM signal is in the high level after the time t2 is represented by "U2×Δ" because the reference signal after the time t2 is "U2". The other portions of the chart are similar to that of FIG. 3 in the first comparative example, and the description is omitted herein.

The duty ratio of the PWM signal after the time t2 is represented by "U2×Δ/T2". "switching time T2>switching time T1" holds. Thus, the duty ratio of the PWM signal after the time t2 is reduced as compared with the first comparative example. The generation unit 22 generates a reference signal U2 on the basis of the output voltage Vo before the time t2 (that is, in the cycle T1). Therefore, the reference signal U2 is generated so that the duty ratio of the PWM signal becomes appropriate in the cycle T1. Thus, when the duty ratio of the PWM signal after the time t2 is "U2×Δ/T2", the output voltage Vo is not be able to be controlled appropriately, so that a transient response is generated in the output voltage Vo. As described above, in the method of FIG. 4A, that is, when the switching unit 26 switches the frequency of a carrier signal by changing the amplitude of the carrier signal, the output voltage is not be able to be stabilized.

In the embodiments that are described below, the output voltage may be stabilized.

First Embodiment

Figure 7:
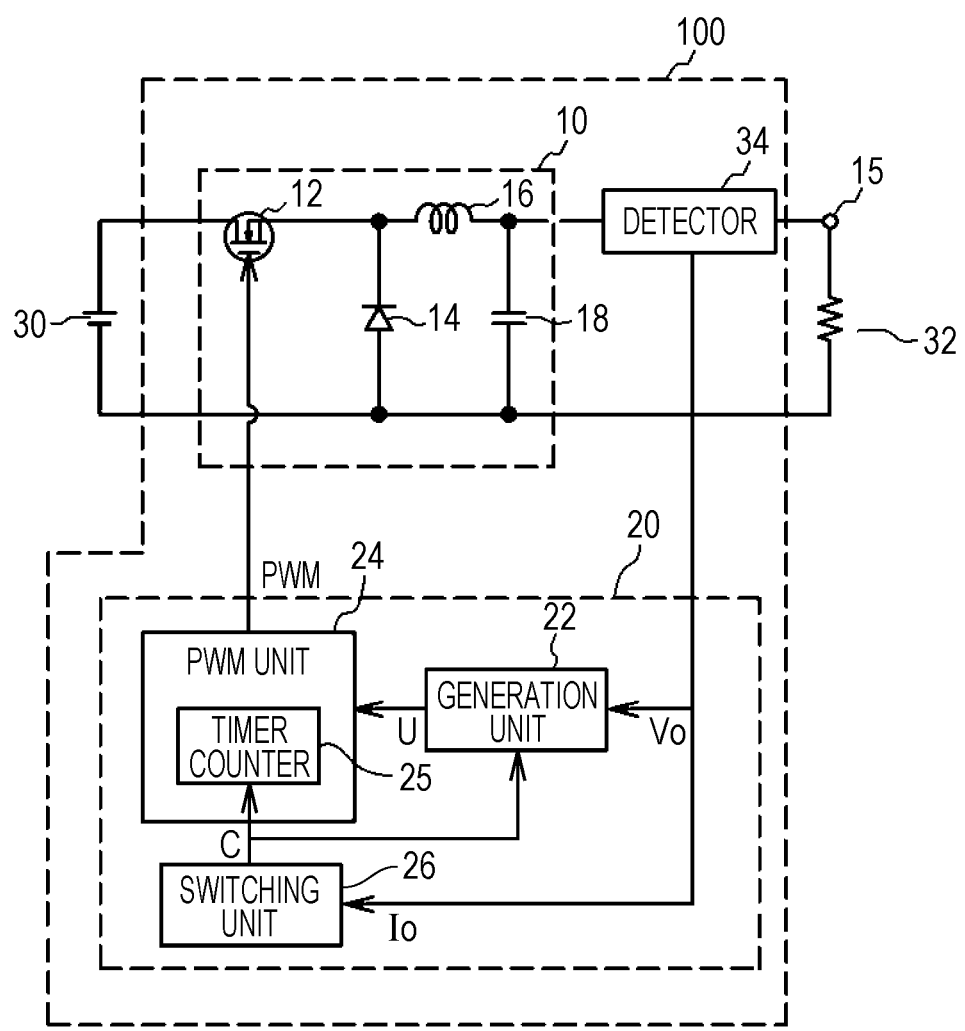
FIG. 7 is block diagram of a power supply device according to a first embodiment.

FIG. 7 is block diagram of a power supply device according to a first embodiment. Referring to FIG. 7, in a power supply device 100, a signal C that is output from the switching unit 26 is received by the generation unit 22. The generation unit 22 generates a reference signal U on the basis of the frequency of a carrier signal in addition to output voltage Vo. The other elements in the configuration are similar to that of FIG. 5 in the second comparative example, and the description is omitted herein.

Figure 8:
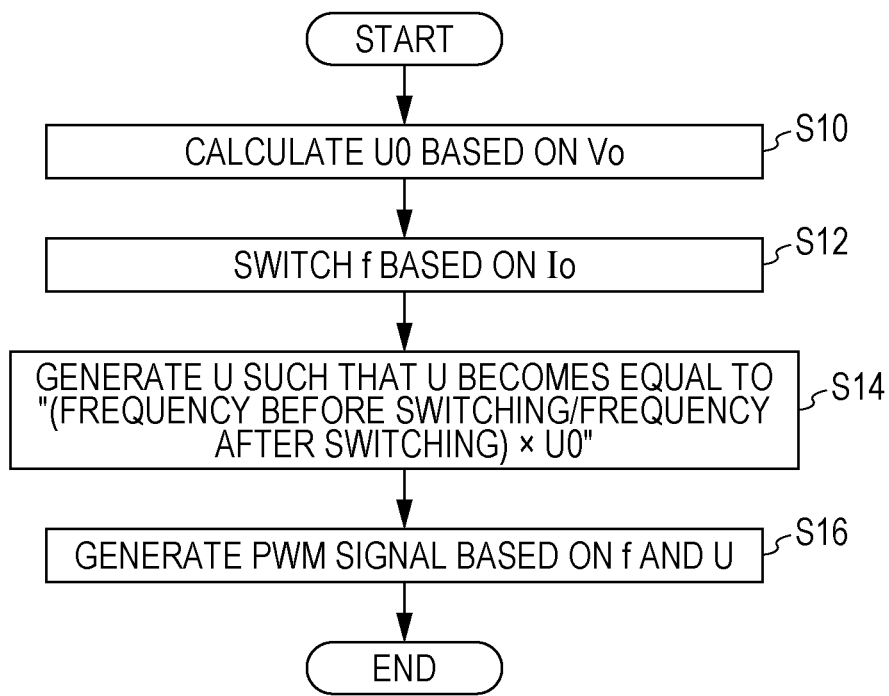
FIG. 8 is a flowchart illustrating a control process of a control device according to the first embodiment.

FIG. 8 is a flowchart illustrating a control process of a control device according to the first embodiment. Referring to FIG. 8, the generation unit 22 calculates a value U0 on the basis of the output voltage Vo that is detected by the detection unit 34 (Step S10). The switching unit 26 switches a frequency f of a carrier signal on the basis of the load current Io that is detected by the detector 34 (Step S12). The generation unit 22 generates a reference signal U so that the reference signal U becomes equal to "(frequency before switching/frequency after switching)×U0" (Step S14). The PWM unit 24 generates a PWM signal on the basis of the frequency f and the reference signal U (Step S16).

Figure 9:
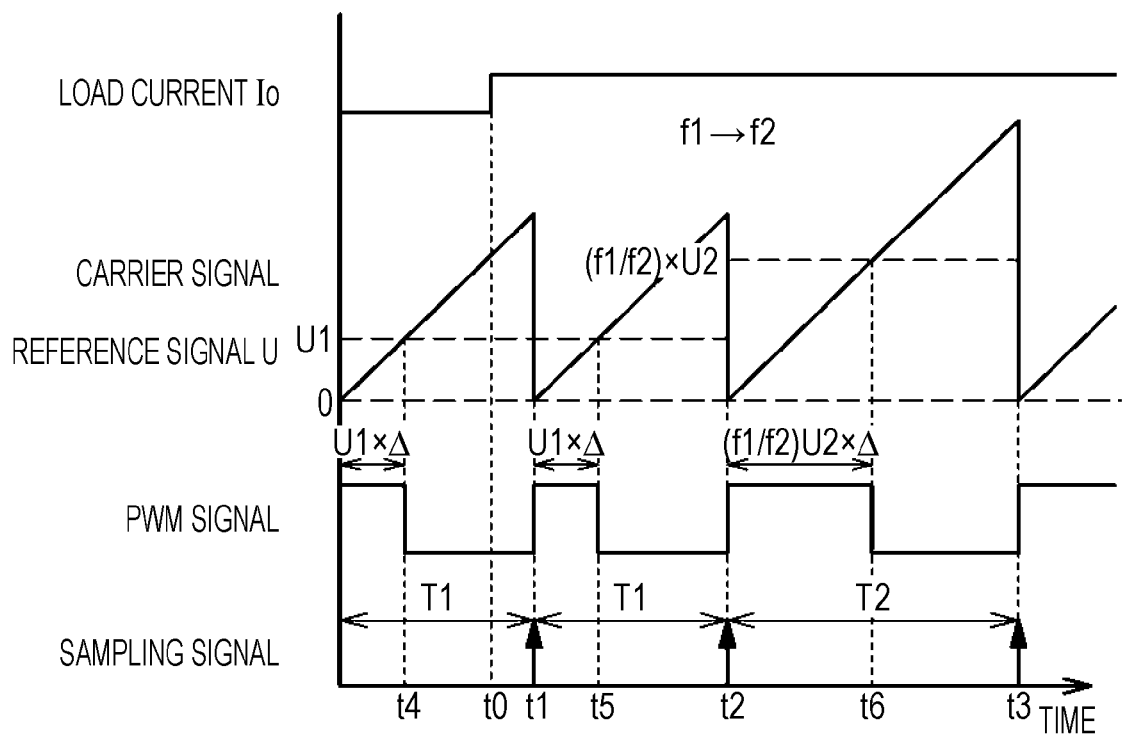
FIG. 9 is a timing chart of load current, a carrier signal, a PWM signal, and a sampling signal in the first embodiment.

FIG. 9 is timing chart of load current, a carrier signal, a PWM signal, and a sampling signal in the first embodiment. Referring to FIG. 9, the reference signal after the time t2 is represented by "(f1/f2)×U2". A time period in which the PWM signal is in a high level after the time t2 is represented by "(f1/f2)×U2×Δ". The other portions of the chart are similar to that of FIG. 6 in the second comparative example, and the description is omitted herein.

The duty ratio of the PWM signal after the time t2 is represented by "(f1/f2)×U2×Δ/T2". Since the equations, "T2=1/f2" and "f1=1/T1", are satisfied, "(f1/f2)×U2×Δ/T2=f1×U2×Δ=U2×Δ/T1" is also satisfied. This is equal to the duty ratio of the PWM signal after the time t2 in FIG. 3. That is, even after the time t2, the duty ratio is appropriate in the PWM signal.

According to the first embodiment, the generation unit 22 generates a reference signal U on the basis of the frequency of a carrier signal in addition to the output voltage Vo. Therefore, as illustrated in FIG. 9, the duty ratio of the PWM signal may be controlled appropriately, and the output voltage may be stabilized.

In addition, the generation unit 22 generates the reference signal U so that the duty ratio of the PWM signal is not changed when the frequency of the carrier signal is switched. Therefore, the output voltage may be stabilized.

It is desirable that the generation unit 22 generates the reference signal U so that the reference signal U becomes equal to "(frequency before switching/frequency after switching)×U0". Therefore, the duty ratio of the PWM signal may be controlled appropriately.

In addition, the switching unit 26 switches the frequency of the carrier signal on the basis of the load current Io. Therefore, the frequency of the carrier signal, which is appropriate for the load 32 may be selected. Thus, the efficiency of the power supply device is improved. In the first embodiment, as the load 32 is increased, the frequency is reduced, however, as the load 32 is increased, the frequency may be increased.

In addition, the carrier signal is synchronized with a signal that is used to perform sampling on the output voltage Vo by the detector 34. For example, the frequency of the carrier signal and the frequency of the sampling signal are identical and synchronized.

In addition, it is desirable that the carrier signal has a saw-tooth wave. When the carrier signal is linearly changed for the time from a macro perspective, the width of high level of the PWM signal is proportional to the reference signal U. Therefore, the problematic phenomenon described in FIG. 6 easily occurs. The saw-tooth wave may have stair-like steps from a micro perspective as illustrated in FIG. 2. The carrier signal may be a signal to count up, and may be a signal to count down. In addition, the carrier signal may not have a saw-tooth wave. In addition, the carrier signal may be a signal that is generated in an analog manner.

Second Embodiment

Figure 10:
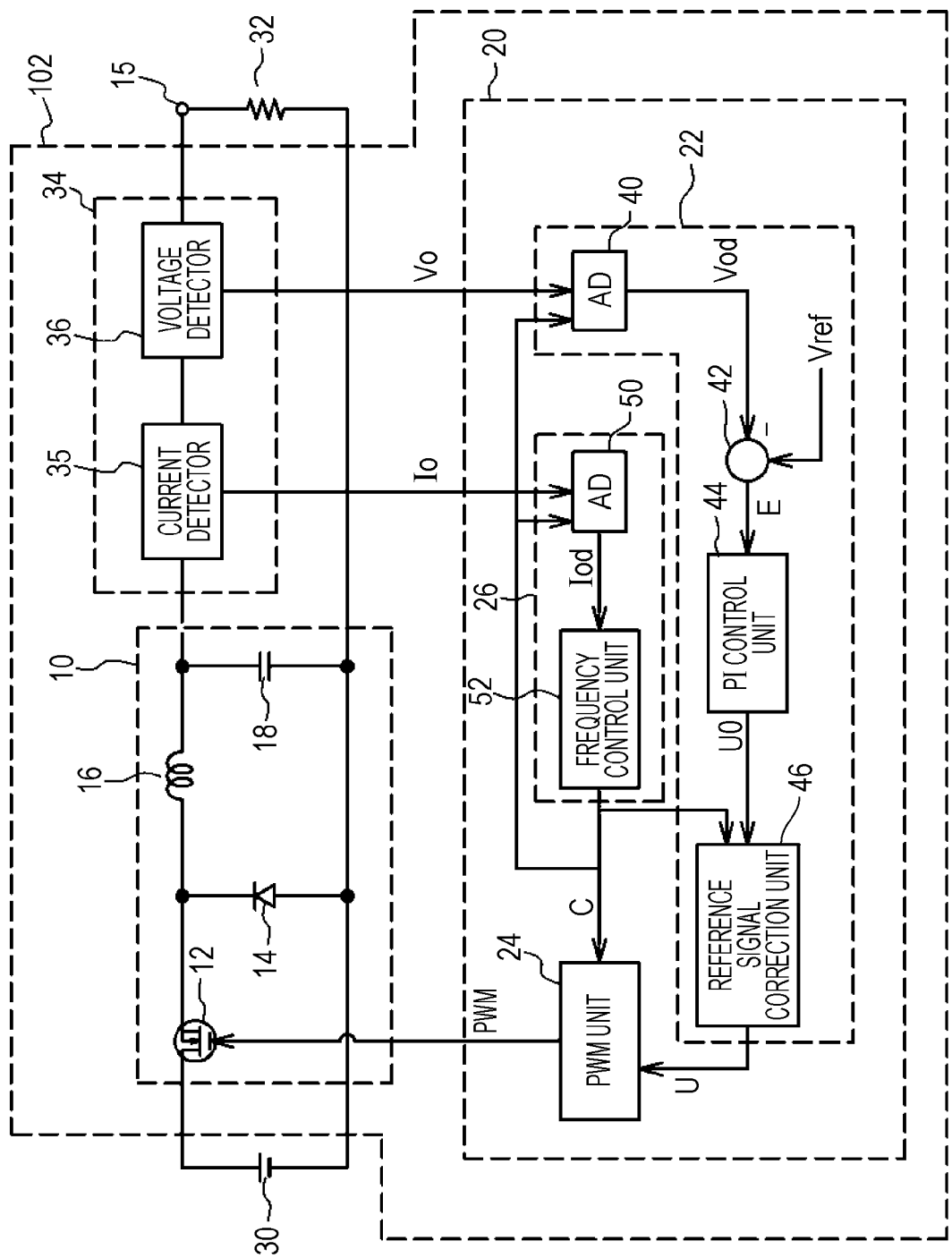
FIG. 10 is a block diagram of a power supply device according to a second embodiment.

FIG. 10 is a block diagram of a power supply device according to a second embodiment. Referring to FIG. 10, in a power supply device 102, the detector 34 includes a current detector 35 and a voltage detector 36. The control device 20 is constituted, for example, by a digital signal processor. The generation unit 22 includes an analog-to-digital (AD) converter 40, an adder 42, a PI control unit 44, and a reference signal correction unit 46. The AD converter 40 converts output voltage Vo into a digital signal voltage Vod at timing of a sampling signal. The adder 42 obtains a signal E by subtracting the digital signal voltage Vod from a reference voltage Vref that is stored in a memory. The PI control unit 44 performs a proportional and integration operation on the signal E to generate a signal U0. That is, the PI control unit 44 performs feedback control so that the output voltage Vo is kept stable. The reference signal correction unit 46 corrects the signal U0 and determines the signal as a reference signal U. The calculation to generate the reference signal U in the reference signal correction unit 46 is performed in one sampling cycle.

The switching unit 26 includes an AD converter 50 and a frequency control unit 52. The AD converter 50 converts the load current Io into a digital signal Iod at timing of the sampling signal. The frequency control unit 52 generates a signal C on the basis of the signal Iod. The PWM unit 24 generates a PWM signal on the basis of the signal C and the reference signal U. The frequency control unit 52 causes the AD converters 40 and 50 to switch the frequency of the sampling signal by performing synchronization with the carrier signal. The calculation to generate the signal C in the frequency control unit 52 is performed in one sampling cycle. The other elements in the configuration are similar to that of FIG. 7 in the first embodiment, the description is omitted herein.

Figure 11:
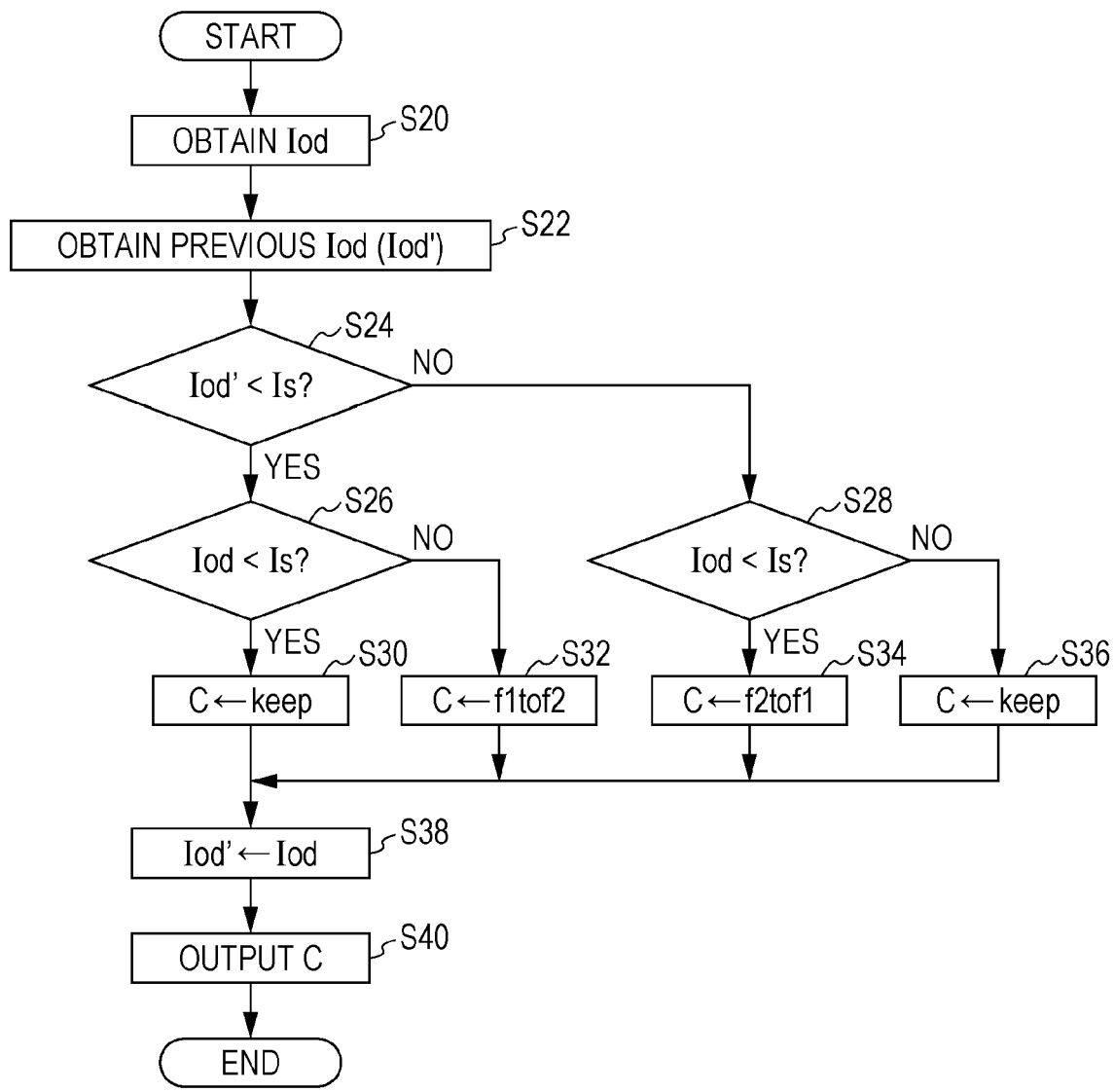
FIG. 11 is a flowchart illustrating processing that is executed by a frequency control unit.

FIG. 11 is a flowchart illustrating a process that is executed by the frequency control unit. Referring to FIG. 11, the frequency control unit 52 obtains a signal Iod from the AD converter 50 (Step S20). After that, the frequency control unit 52 obtains a signal Iod' that is a previous signal Iod from the memory (Step S22). After that, the frequency control unit 52 determines whether the signal Iod' is less than a threshold value Is (Step S24). When "Yes" is determined, the frequency control unit 52 determines whether the signal Iod is less than the threshold value Is (Step S26). When "Yes" is determined, the frequency control unit 52 sets the signal C to "keep" (Step S30). When "No" is determined, the frequency control unit 52 sets the signal C to "f1 to f2" (Step S32). After that, the flow proceeds to Step S38.

In Step S24, when "No" is determined, the frequency control unit 52 determines whether the signal Iod is less than the threshold value Is (Step S28). When "Yes" is determined, the frequency control unit 52 sets the signal C to "f2 to f1" (Step S34). When "No" is determined, the frequency control unit 52 sets the signal C to "keep" (Step S36). After that, the flow proceeds to Step S38. In Step S38, the frequency control unit 52 determines the signal Iod as the signal Iod' and stores the signal in the memory (Step S38). After that, the frequency control unit 52 outputs the signal C to the PWM unit 24 (Step S40). After that, the processing ends, and the flow returns to Step S20.

As described above, the frequency control unit 52 switches the frequency of the carrier signal from "f1" to "f2" when the previous signal Iod (signal Iod') is less than the threshold value Is and the current signal Iod is the threshold value Is or more. The frequency control unit 52 switches the frequency of the carrier signal from "f2" to "f1" when the previous signal Iod is the threshold value Is or more and the current signal Iod is less than the threshold value Is. The frequency control unit 52 does not switch the frequency in the other cases. Therefore, when the signal Iod is less than the threshold value Is, the frequency of the carrier signal corresponds to "f1", and when the signal Iod is the threshold value Is or more, the frequency of the carrier signal corresponds to "f2".

Figure 12:
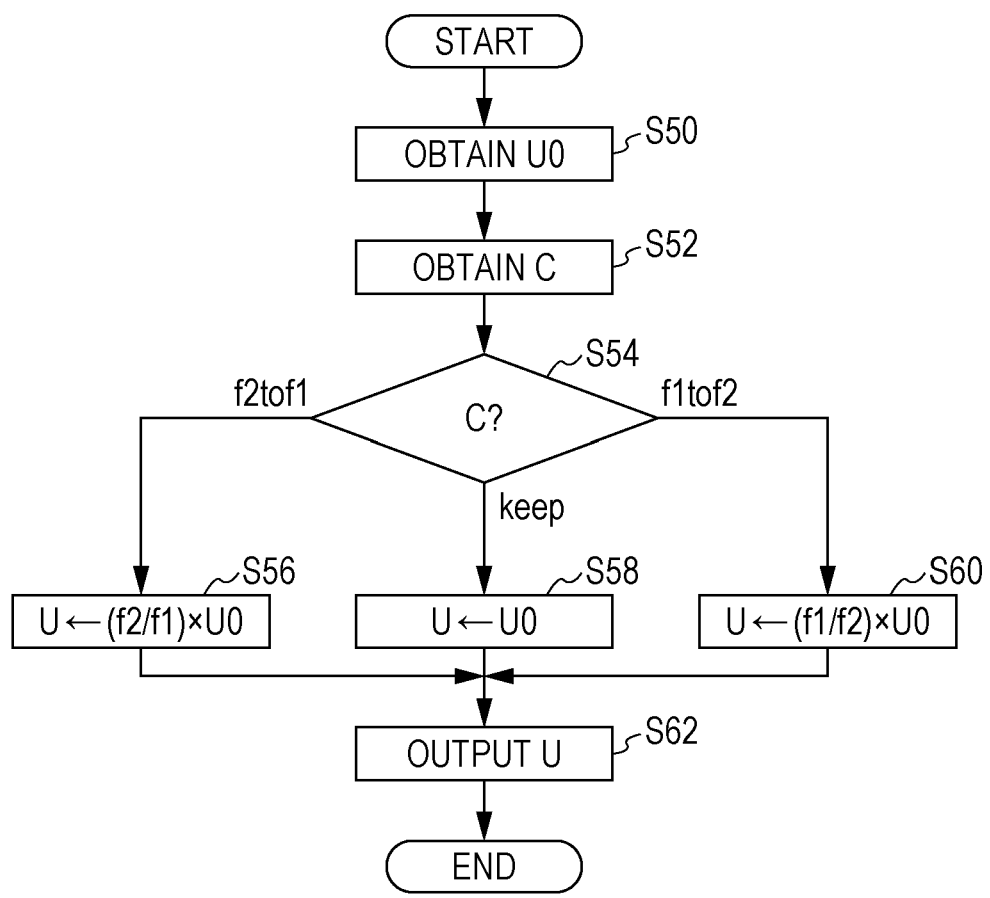
FIG. 12 is a flowchart illustrating processing that is executed by a reference signal correction unit.

FIG. 12 is a flowchart illustrating a process that is executed by the reference signal correction unit. Referring to FIG. 12, the reference signal correction unit 46 obtains a signal U0 from the PI control unit 44 (Step S50). After that, the reference signal correction unit 46 obtains a signal C from the frequency control unit 52 (Step S52). After that, the reference signal correction unit 46 determines the signal C (Step S54). When the reference signal correction unit 46 determines that the signal C is "f2 to f1", the reference signal correction unit 46 determines the reference signal U as "(f2/f1)×U0" (Step S56). When the reference signal correction unit 46 determines that the signal C is kept, the reference signal correction unit 46 determines the reference signal U as "U0" (Step S58). When the reference signal correction unit 46 determines that the signal C is "f1 to f2", the reference signal correction unit 46 determines the reference signal U as "(f1/f2)×U0" (Step S60). After that, the reference signal correction unit 46 outputs the reference signal U to the PWM unit 24 (Step S62). After that, the processing ends, and the flow returns to Step S50.

As described above, the reference signal correction unit 46 determines the reference signal U as "(f2/f1)×U0" when the frequency of the carrier signal is switched from "f2" to "f1", and determines the reference signal U as "(f1/f2)×U0" when the frequency of the carrier signal is switched from "f1" to "f2". Therefore, as illustrated in FIG. 9, the duty ratio of the PWM signal may be controlled at a desired value even when the frequency is switched.

In the second embodiment, the output voltage Vo when the frequency of the carrier signal is switched is measured. A power supply device in which the reference signal correction unit 46 is not used is applied as a third comparative example. That is, in the third comparative example, "U=U0" is satisfied regardless of the frequency of the carrier signal. In order to merely see the effect of the reference signal correction unit 46, the load current Io is kept stable. That is, the frequency control unit 52 is caused to output "C=f2 to f1" or "C=f1 to f2" while keeping the load current Io stable. Here, "f1" is set at 130 kHz, and "f2" is set as 100 kHz.

Figure 13A:
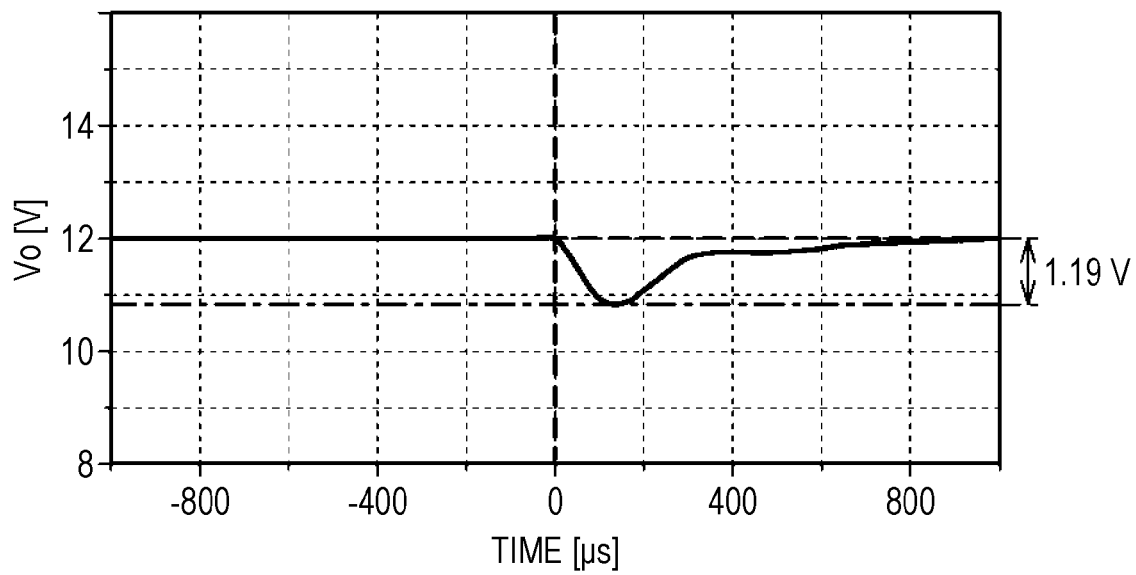
FIGS. 13A and 13B are timing charts of output voltage in cases of "f1 to f2" and "f2 to f1", respectively, in a third comparative example.
Figure 13B:
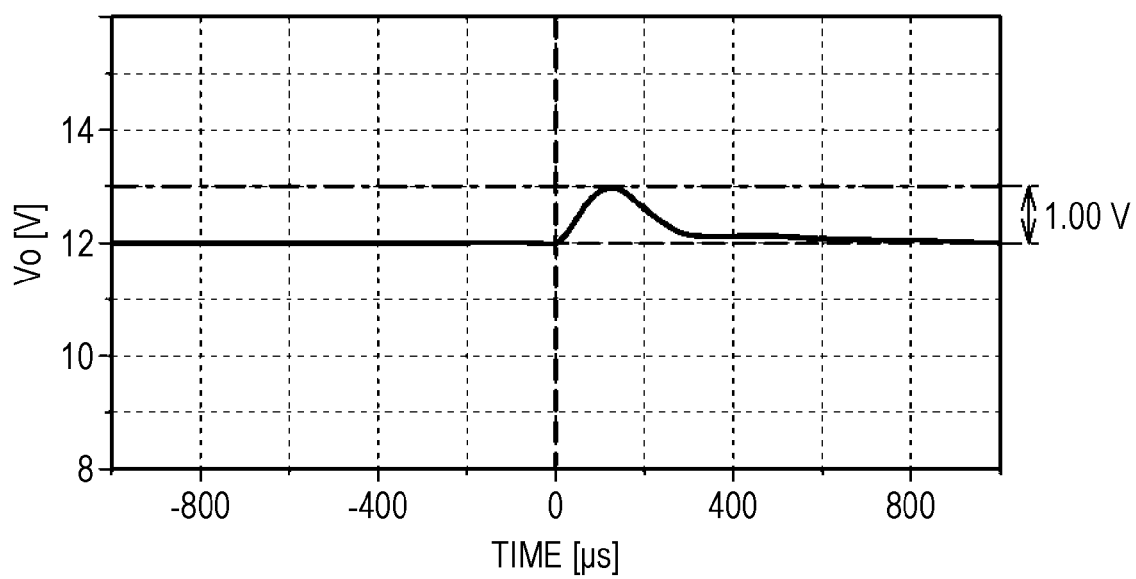

FIGS. 13A and 13B are timing charts of output voltage in cases of "f1 to f2" and "f2 to f1", respectively, in the third comparative example. When the time is "0", the frequency is switched. Referring to FIG. 13A, when the frequency is switched from 130 kHz to 100 kHz, the output voltage Vo is reduced by 1.19 V at maximum. Referring to FIG. 13B, when the frequency is switched from 100 kHz to 130 kHz, the output voltage Vo is increased by 1.00 V at maximum. As described above, in the third comparative example, a transient response of the output voltage Vo is generated.

Figure 14A:
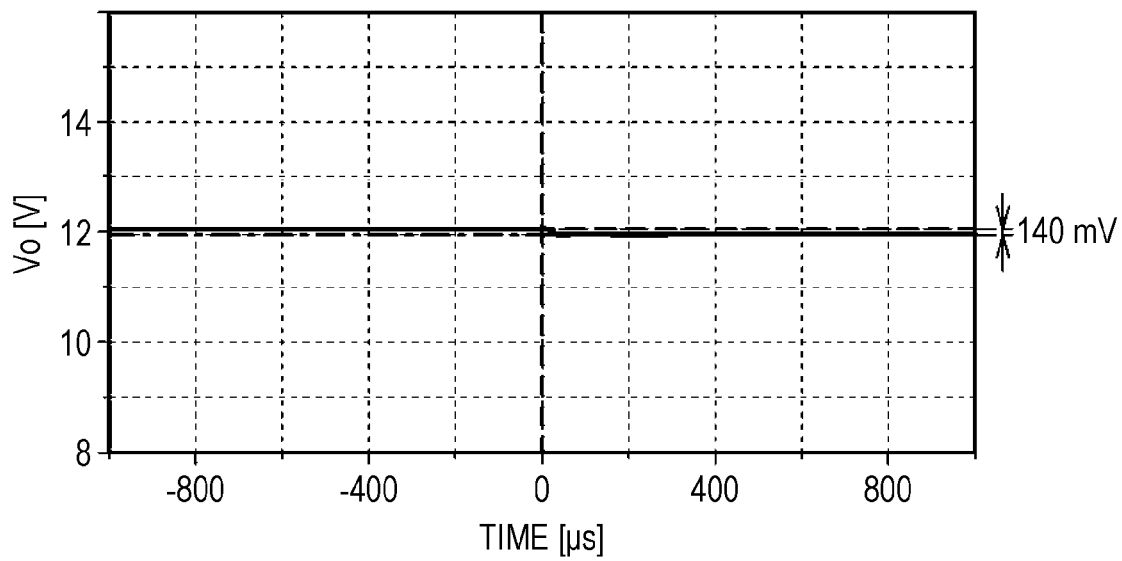
FIGS. 14A and 14B are timing charts of output voltage in cases of "f1 to f2" and "f2 to f1", respectively, in the second embodiment.
Figure 14B:
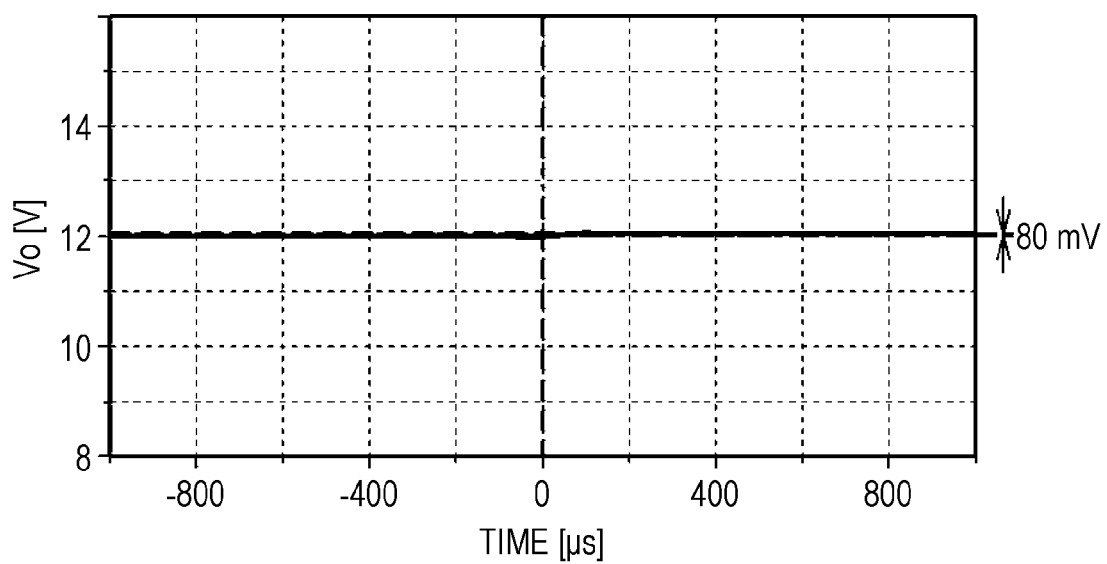

FIGS. 14A and 14B are timing charts of output voltage in cases of "f1 to f2" and "f2 to f1", respectively, in the second embodiment. When the time is "0", the frequency is switched. Referring to FIG. 14A, when the frequency is switched from 130 kHz to 100 kHz, the output voltage Vo is reduced by 140 mV at maximum. Referring to FIG. 14B, when the frequency is switched from 100 kHz to 130 kHz, the output voltage Vo is increased by 80 mV at maximum. As described above, in the second embodiment, a transient response of the output voltage Vo may be suppressed. As illustrated in FIG. 9, this is why the duty ratio of the PWM signal may be controlled appropriately when the frequency of the carrier signal is switched.

In the second embodiment, the frequency control unit 52 may have a hysteresis in its input-output characteristic when the signal C is generated. Therefore, frequent switching of the frequency may be suppressed. As the method of performing feedback control by which the output voltage Vo is kept stable, the PI control is described as an example, however, PID control or further complicated control may be applied to the method. The generation of the signal C in the frequency control unit 52 may be performed in a plurality of cycles.

In the second embodiment, the example is described above in which the output voltage Vo and the load current Io are digitalized, and the control device 20 executes the digital processing for a signal, however, the control device 20 may execute analog processing or partially execute analog processing. For example, the control device 20 may use the output voltage Vo and the load current Io without analog-digital conversion. In addition, a carrier signal may be generated by an oscillator.

In the first and second embodiments, the example is described above in which the frequency of the carrier signal is switched between two stages of "f1" and "f2", however, the frequency may be switched between three stages or more. As the switching element, the description is made using the MOSFET as an example, the switching element may be an FET other than the MOSFET. In addition, the switching element may be a P-type FET. In addition, the switching element may be an insulator gate bipolar transistor (IGBT) other than the FET.

In addition, as the power supply circuit 10, the description is made using the non-isolated and step-down type as an example, however, the power supply circuit 10 may be an isolated type, and may be a step-up type or inversion type.

FIG. 15 is a block diagram of a server in the first or second embodiment. Referring to FIG. 15, a server 60 includes a rectifier 62, a power factor correction circuit 64, a power supply device 66, a main board 68, a hard disk 70, a storage medium drive such as a compact disc (CD)-read only memory (ROM) drive 72, and a large scale integrated circuit (LSI) 74. AC power is supplied from an external power supply 76 to the rectifier 62 of the server 60. The rectifier 62 rectifies the AC wave. The power factor correction circuit 64 improves the power factor. The external power supply 76, the rectifier 62, and the power factor correction circuit 64 correspond to the DC power supply 30 in the first or second embodiment. The power supply device 66 corresponds to the power supply device 100 or 102 in the first or second embodiment, and performs conversion of voltage of the DC power. The DC power is supplied from the power supply device 66 to the main board 68 that includes a central processing unit (CPU) and/or a memory, the hard disk 70, and the CD-ROM drive 72, and the LSI 74. The main board 68, the hard disk 70, the CD-ROM drive 72, and the LSI 74 correspond to the load 32 in the first or second embodiment. The power supply device in the first or second embodiment may be used for an electronic device other than the server.

The embodiments of the present disclosure are described above, and the present disclosure is not limited to the specific embodiments, and variations and modifications are allowed to be made within the scope of the present disclosure described in the claims.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device comprising:
a power supply circuit that controls an output voltage using a switching element;
a generation unit that generates a reference signal;
a pulse width modulation unit that generates a pulse width modulation signal that is output to the switching element by comparing the reference signal with a carrier signal; and
a switching unit that switches a frequency of the carrier signal by changing amplitude of the carrier signal, wherein
the generation unit generates the reference signal based on the output voltage of the power supply circuit, a frequency of the carrier signal before the switching, and the frequency of the carrier signal after the switching.

2. The control device according to claim 1, wherein the generation unit generates the reference signal such that a duty ratio of the pulse width modulation signal is not changed when the frequency of the carrier signal is switched.

3. The control device according to claim 1, wherein the carrier signal is synchronized with a signal that is used to perform sampling on the output voltage.

4. The control device according to claim 2, wherein the carrier signal is synchronized with a signal that is used to perform sampling on the output voltage.

5. The control device according to claim 1, wherein the switching unit switches the frequency of the carrier signal on a basis of load current.

6. The control device according to claim 2, wherein the switching unit switches the frequency on the basis of load current.

7. The control device according to claim 3, wherein the switching unit switches the frequency on the basis of load current.

8. The control device according to claim 1, wherein the carrier signal has a saw-tooth wave.

9. The control device according to claim 2, wherein the carrier signal has a saw-tooth wave.

10. The control device according to claim 3, wherein the carrier signal has a saw-tooth wave.

11. The control device according to claim 4, wherein the carrier signal has a saw-tooth wave.

12. The control device according to claim 1, wherein the power supply circuit is a non-isolated power supply circuit.

13. The control device according to claim 2, wherein the power supply circuit is a non-isolated power supply circuit.

14. The control device according to claim 3, wherein the power supply circuit is a non-isolated power supply circuit.

15. The control device according to claim 4, wherein the power supply circuit is a non-isolated power supply circuit.

16. The control device according to claim 5, wherein the power supply circuit is a non-isolated power supply circuit.

17. The control device according to claim 1, wherein the power supply circuit is a step-down power supply circuit.

18. The control device according to claim 2, wherein the power supply circuit is a step-down power supply circuit.

19. A power supply device comprising:
a power supply circuit that controls an output voltage using a switching element;
a generation unit that generates a reference signal;
a pulse width modulation unit that generates a pulse width modulation signal that is output to the switching element by comparing the reference signal with a carrier signal; and
a switching unit that switches a frequency of the carrier signal by changing amplitude of the carrier signal, wherein
the generation unit includes a control circuit that generates the reference signal based on the output voltage of the power supply circuit, a frequency of the carrier signal before the switching, and the frequency of the carrier signal after the switching.

20. A control method comprising:
controlling an output voltage of a power supply circuit using a switching element;
generating a reference signal;
generating a pulse width modulation signal that is output to the switching element by comparing the reference signal with a carrier signal; and
switching a frequency of the carrier signal by changing amplitude of the carrier signal, wherein
in the generating of the reference signal, the reference signal is generated based on the output voltage of the power supply circuit, a frequency of the carrier signal before the switching, and the frequency of the carrier signal after the switching.

* * * * *